United States Patent [19]

Palermiti

[11] Patent Number: 5,118,517
[45] Date of Patent: Jun. 2, 1992

[54] METHOD OF MANUFACTURING POWDERED FRUIT JUICE USING DEXTRAN

[75] Inventor: Frank M. Palermiti, Indialantic, Fla.

[73] Assignee: F&MP Research and Development Laboratories, Inc., Indialantic, Fla.

[21] Appl. No.: 729,599

[22] Filed: Jul. 15, 1991

[51] Int. Cl.$^5$ ................................................ A23L 2/02
[52] U.S. Cl. .................................. 426/330.5; 426/384; 426/442; 426/443; 426/591; 426/599
[58] Field of Search ............... 426/330.5, 591, 384, 426/471, 442, 443, 599

[56] References Cited

U.S. PATENT DOCUMENTS

| | | | |
|---|---|---|---|
| 2,367,131 | 1/1945 | Leo | 426/471 |
| 4,112,130 | 9/1978 | Gupta | 426/599 |
| 4,717,578 | 1/1988 | Biller | 426/599 |
| 4,855,149 | 8/1989 | Pucci | 426/658 |
| 4,877,634 | 10/1989 | Pucci | 426/658 |
| 4,933,191 | 6/1990 | Pucci | 426/658 |
| 4,996,196 | 2/1991 | Mitsuhashi | 426/442 |
| 5,026,566 | 6/1991 | Roser | 426/599 |

OTHER PUBLICATIONS

MCP Technical Data 1977 p. 16.

*Primary Examiner*—Carolyn Paden
*Attorney, Agent, or Firm*—Rogers & Killeen

[57] ABSTRACT

A method of manufacturing a powder that may be reconstituted as a fruit drink by addition of water to the powder includes the use of dextran as a drying agent for the fruit juice that is to be rendered to powder. The dextran should be of high purity and have a predetermined molecular weight in the range of 10,000 to 40,000,000. The amount of dextran dissolved in the fruit juice may range from about one-tenth to equal parts by weight of the total carbohydrate content of the fruit juice, and is inversely related to the predetermined molecular weight.

7 Claims, No Drawings

METHOD OF MANUFACTURING POWDERED FRUIT JUICE USING DEXTRAN

BACKGROUND OF THE INVENTION

The present invention relates to a method of manufacturing a powder that may be reconstituted as a fruit drink by addition of water to the powder. More specifically, the invention relates to the use of dextran as a drying agent for the fruit juices that are to be rendered to a powder.

It has long been a goal of the food industry to produce a powdered drink that tastes the same as real fruit juice. It has been a further goal to be able to make such a powdered drink from the juice of real fruit. The term "fruit juice" as used herein refers to the juice of citrus fruits that contain fructose.

Attempts to produce a powder from fruit juice have not been successful because traditional powder rendering processes cause the fruit juice to become a sticky nonfree-flowing product, rather than a powder. For example, lyophilization or spray drying of the fruit juice does not produce the sought after powder because the powder rendering processes do not powderize the fructose in the fruit juice.

The method of the present invention avoids the problems of the prior art by using dextran as a drying agent for the fructose. Further, and perhaps more significantly, the juice produced from the powder manufactured by the method of the present invention tastes like real fruit juice.

The term "dextran" refers to water soluble polymers having α-D-glucopyranosyl units polymerized predominately in a α, 1→6 linkage. Dextran polymers may have molecular weights ranging from 10,000 to several million. Typically, the dextran polymers are synthesized and fractionated so as to produce dextran polymers having a predetermined range of molecular weights.

Dextran has various uses depending on its molecular weight. For example, high purity, USP grade dextrans (1,000,000–40,000,000 molecular weight) have found application as surgical sponges. Clinical grade dextrans (40,000–75,000 molecular weight) have found extensive use as blood volume expanders. At lower molecular weights it has found use as a stabilizer or bodying agent in foods. For example, complex mixtures containing dextran have been used as a thickeners for powdered milk (see U.S. Pat. No. 4,855,149 to Pucci, et al.), and as stabilizers for fruit juice powders (See U.S. Pat. No. 4,996,196 to Mitsuhashi, et al.).

Accordingly it is an object of the present invention to provide a novel method of manufacturing a powder from fruit juice that obviates the problems of the prior art.

It is a further object of the present invention to provide a novel method of manufacturing a powder for a juice drink by using as a drying agent high purity dextran having a predetermined molecular weight.

It is yet a further object of the present invention to provide a novel method of manufacturing a powder for a juice drink by dissolving dextran in a fruit juice wherein the amount of dextran added is inversely related to the molecular weight of the dextran.

These and other objects and advantages of the present invention will be readily apparent to one skilled in the art to which the invention pertains from a perusal of the claims and of the following detailed description of preferred embodiments.

DESCRIPTION FOR PREFERRED EMBODIMENTS

The present invention uses dextran as a drying agent for fruit juices that are to be rendered to powder. The powder is able to be reconstituted as a fruit drink by addition of ordinary water thereto. The dextran should have a high purity to meet federal standards for use in foods for human consumption. For example, the dextran should be pyrogen free and meet USP requirements and specifications.

The amount of dextran used and the molecular weight of the dextran are inversely related. That is, small amounts of high molecular weight dextran or larger amounts of low molecular weight dextran may be used in the present invention. By way of example, for dextran having a molecular weight of approximately 40,000 to 75,000, the amount of dextran used may be approximately one-quarter parts by weight of the total carbohydrate content of the fruit juice. Dextran having a molecular weight of approximately 10,000 to 40,000 may be dissolved in approximately equal parts by weight of the total carbohydrate content of the fruit juice. Dextran having a higher molecular weight of approximately 75,000 to 40,000,000 may be dissolved in approximately one-tenth parts by weight of the total carbohydrate content of the fruit juice.

Desirably, the dextran has a predetermined molecular weight in the range of 40,000 to 70,000 and in the amount 0.2 to 0.3 parts by weight of the total carbohydrate content of the fruit juice.

The dextran may be dissolved in the fruit juice after the fruit juice has been filtered to remove seeds and heavy pulp and before the juice is rendered to powder by an appropriate process, such as lyophilization or spray drying. The powder may be reconstituted as a fruit drink by addition of water to the powder. The amount of water added should be approximately equal to the amount of fruit juice that was rendered to powder originally.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a perusal hereof.

I claim:

1. In a method of manufacturing a powder able to be reconstituted as a fruit drink by the addition of water thereto, the improvement comprising the dissolving of a drying agent in a fruit juice before rendering the fruit juice to powder, the drying agent comprising a predetermined amount of high purity dextran having a predetermined molecular weight in the range of 10,000 to 40,000,000, the amount of dextran dissolved ranging from about one-tenth to equal parts by weight of the total carbohydrate content of the fruit juice, and being inversely related to the predetermined molecular weight.

2. The improvement as defined in claim 1 wherein the dextran has a molecular weight of approximately 10,000 to 40,000 and the amount of dextran dissolved is approximately equal parts by weight of the total carbohydrate content of the fruit juice.

3. The improvement as defined in claim 1 wherein the dextran has a molecular weight of approximately 40,000 to 75,000 and the amount of dextran dissolved is approximately one-quarter parts by weight of the total carbohydrate content of the fruit juice.

4. The improvement as defined in claim 1 wherein the dextran has a molecular weight of approximately 75,000 to 40,000,000 and the amount of dextran dissolved is approximately one-tenth parts by weight of the total carbohydrate content of the fruit juice.

5. The improvement as defined in claim 1 wherein the fruit juice is rendered to powder by spray drying.

6. The improvement as defined in claim 1 wherein the fruit juice is rendered to powder by lyophilization.

7. A method of manufacturing a powder able to be reconstituted as a fruit drink by the addition of water thereto comprising the steps of:
 a. squeezing citrus fruits to provide fruit juice;
 b. filtering said fruit juice to remove seeds and heavy pulp;
 c. dissolving into said filtered fruit juice a predetermined amount of high purity dextran having a predetermined molecular weight in the range of 40,000 to 75,000, the predetermined amount of dextran being about 0.2 to 0.3 parts by weight of the total carbohydrate content of said filtered fruit juice; and
 d. lyophilizing the mixture to form a powder that may be reconstituted as a juice drink by the addition of water thereto.

* * * * *